(12) United States Patent
Masukawa et al.

(10) Patent No.: US 7,435,279 B2
(45) Date of Patent: Oct. 14, 2008

(54) HONEYCOMB STRUCTURE

(75) Inventors: Naoshi Masukawa, Nishikasugai-gun (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 496 days.

(21) Appl. No.: 10/532,310

(22) PCT Filed: Nov. 11, 2004

(86) PCT No.: PCT/JP2004/016760

§ 371 (c)(1),
(2), (4) Date: Apr. 22, 2005

(87) PCT Pub. No.: WO2005/047209

PCT Pub. Date: May 26, 2005

(65) Prior Publication Data

US 2006/0101747 A1    May 18, 2006

(30) Foreign Application Priority Data

Nov. 12, 2003  (JP) .............. 2003-382536

(51) Int. Cl.
*B01D 39/20* (2006.01)
(52) U.S. Cl. .......... 55/523; 55/524; 55/DIG. 30
(58) Field of Classification Search ........ 55/523, 55/524, DIG. 30; 422/177
See application file for complete search history.

(56) References Cited

U.S. PATENT DOCUMENTS

| 5,914,187 | A | * | 6/1999 | Naruse et al. ............ 428/327 |
| 6,669,751 | B1 | * | 12/2003 | Ohno et al. ............... 55/523 |
| 6,942,712 | B2 | * | 9/2005 | Hamanaka et al. ......... 55/523 |
| 6,984,253 | B2 | * | 1/2006 | Ichikawa et al. ........... 55/484 |
| 7,041,359 | B2 | * | 5/2006 | Hijikata ................... 428/116 |
| 7,052,760 | B2 | * | 5/2006 | Hijikata ................... 428/116 |
| 7,056,568 | B2 | * | 6/2006 | Ichikawa et al. .......... 428/116 |
| 7,078,086 | B2 | * | 7/2006 | Hijikata ................... 428/116 |
| 7,087,286 | B2 | * | 8/2006 | Hijikata ................... 428/116 |
| 7,112,233 | B2 | * | 9/2006 | Ohno et al. ................ 55/523 |
| 7,138,002 | B2 | * | 11/2006 | Hamanaka et al. ......... 55/523 |
| 7,169,203 | B2 | * | 1/2007 | Sakamoto .................. 55/523 |
| 2004/0076794 | A1 | * | 4/2004 | Hijikata ................... 428/116 |
| 2004/0093858 | A1 | * | 5/2004 | Aoki ........................ 60/299 |
| 2004/0142145 | A1 | * | 7/2004 | Hashimoto et al. ........ 428/116 |
| 2004/0244344 | A1 | * | 12/2004 | Ichikawa .................... 55/523 |
| 2005/0011174 | A1 | * | 1/2005 | Hong et al. ................. 55/523 |
| 2005/0016141 | A1 | * | 1/2005 | Hong et al. ................. 55/523 |

(Continued)

FOREIGN PATENT DOCUMENTS

JP        3121497        12/2000

(Continued)

*Primary Examiner*—Duane Smith
*Assistant Examiner*—Robert A Clemente
(74) *Attorney, Agent, or Firm*—Oliff & Berridge, PLC (57) ABSTRACT

The honeycomb structure of the present invention has a construction wherein a plurality of cells 5 each functioning as a passage of a fluid, surrounded by porous partition walls 6 are arranged so as to be parallel to each other in the central axis direction of the honeycomb structure, and has such a constitution that a plurality of honeycomb segments 2 are bonded integrally by a bonding material 9 containing a ceramic as a main component and a particulate filler. In the honeycomb structure, generation of drawbacks such as peeling of bonded area, cracking and the like is suppressed reliably, and the honeycomb structure is superior in durability.

8 Claims, 3 Drawing Sheets

U.S. PATENT DOCUMENTS

| | | | |
|---|---|---|---|
| 2005/0076626 A1* | 4/2005 | Kudo et al. | 55/523 |
| 2005/0102987 A1* | 5/2005 | Kudo | 55/523 |
| 2005/0109023 A1* | 5/2005 | Kudo et al. | 60/311 |
| 2005/0126140 A1* | 6/2005 | Ito et al. | 55/523 |
| 2005/0160710 A1* | 7/2005 | Taoka et al. | 55/523 |
| 2005/0166729 A1* | 8/2005 | Nishio | 83/13 |
| 2005/0169819 A1* | 8/2005 | Shibata | 422/177 |
| 2005/0175514 A1* | 8/2005 | Ohno | 422/177 |
| 2005/0214504 A1* | 9/2005 | Yoshida | 428/116 |
| 2005/0235621 A1* | 10/2005 | Kunieda et al. | 55/523 |
| 2006/0150597 A1* | 7/2006 | Masukawa et al. | 55/523 |
| 2006/0240212 A1* | 10/2006 | Masukawa et al. | 428/58 |
| 2006/0254713 A1* | 11/2006 | Fujita et al. | 156/312 |
| 2006/0288678 A1* | 12/2006 | Yoshida | 55/523 |
| 2007/0051081 A1* | 3/2007 | Mizutani | 55/523 |
| 2007/0125053 A1* | 6/2007 | Matsubara et al. | 55/523 |
| 2007/0227109 A1* | 10/2007 | Hong et al. | 55/523 |

FOREIGN PATENT DOCUMENTS

WO    WO 03/067041 A1    8/2003

* cited by examiner

HONEYCOMB STRUCTURE

TECHNICAL FIELD

The present invention relates to a honeycomb structure wherein a plurality of honeycomb segments are bonded integrally by a bonding material. More particularly, the present invention relates to a honeycomb structure which is useful particularly as a filter for capturing, for example, the particulate present in an exhaust gas, in which the generation of drawbacks (e.g. peeling of bonded area and cracking) after bonding with bonding material, or the generation of drawbacks (e.g. small holes and cracking) after coating with coating material is suppressed reliably, and which is superior in durability.

BACKGROUND ART

As a filter for exhaust gas, a diesel particulate filter (DPF), for example, is incorporated in, for example, the exhaust gas system of diesel engine in order to capture and remove the particulate contained in the exhaust gas emitted from the diesel engine or the like. Filters for exhaust gas such as the above DPF and the like are constituted by a honeycomb structure wherein a plurality of honeycomb segments are bonded integrally by a bonding material.

Such a honeycomb structure has a construction wherein a plurality of cells each functioning as a passage of a fluid, surrounded by porous partition walls made of a silicon carbide, etc. are arranged so as to be parallel to each other in the central axis direction of the honeycomb structure. In producing the honeycomb structure, a plurality of honeycomb segments having such a shape that each segment is part of the honeycomb structure and, when bonded to each other in a direction normal to the central axis of the honeycomb structure, forms the honeycomb structure, are bonded integrally by a bonding material to obtain a bonded body having an intended sectional shape (e.g. a circle) when cut by a plane normal to the central axis direction of the bonded body; then, the outer surface of the bonded body is coated with a coating material. At each end face of the honeycomb structure, the ends of cells adjacent to each other are plugged alternately. That is, one cell is open at one end face and plugged at other end face, and any other cell adjacent thereto is plugged at the same one end face and open at the same other end face.

By producing the honeycomb structure in the above constitution, an exhaust gas can be taken into the honeycomb structure from each one end of given cells, i.e. gas-incoming cells, be moved into cells adjacent to the gas-incoming cells, i.e. gas-leaving cells, via porous partition walls, and be discharged out of the honeycomb structure from the gas-leaving cells; during the movement of the exhaust gas through the partition walls, the particulate present in the exhaust gas can be captured by the partition walls and thereby the exhaust gas can be purified.

The bonding material for bonding a plurality of honeycomb segments integrally and the coating material for coating the outer surface of the resulting bonded body, both used in production of the honeycomb structure are required to have good coatability. In particular, the bonding material is required to also show good spreadability in press-bonding of honeycomb segments. In order for the bonding material and the coating material to have such properties, it is effective to lower their viscosities when they re coated. However, a low-viscosity bonding material and a low-viscosity coating material need to contain a large amount of a solvent, making large the shrinkage caused by solvent removal during drying. As a result, after bonding with the bonding material, drawbacks such as peeling of bonded area, cracking and the like have tended to generate; and, after coating with the coating material, drawbacks such as small holes, cracking, fretting and the like have tended to generate.

As a countermeasure for the above problem, there was disclosed (see a patent literature 1) a ceramic structure wherein an organic binder is added to a bonding material in order to suppress the migration taking place during drying and curing, consequently suppress the above-mentioned drawbacks, and provide a honeycomb structure of improved durability.

In the patent literature 1, as preferred examples of the organic binder, there are mentioned polyvinyl alcohol, methyl cellulose, ethyl cellulose and carboxymethyl cellulose. In the literature, it is disclosed that of these organic binders, carboxymethyl cellulose is preferred because it can ensure fluidity of bonding material during bonding.

Patent literature 1: JP-B-3121497

DISCLOSURE OF THE INVENTION

The bonding material used in the ceramic structure disclosed in the patent literature 1 ensures fluidity during bonding. However, the bonding material gives rise, during its kneading, to a change of state caused by the addition of an organic binder, that is, viscosity increase at the start of kneading and viscosity decrease during continued kneading; thus, the bonding material has unstable properties, and it is difficult to obtain good coatability and good spreadability, and, in fact, it has been difficult to reliably control generation of the above-mentioned drawbacks.

The present invention has been made in view of the above-mentioned problems and aims at providing a honeycomb structure which is useful particularly as a filter for capturing, for example, particulates present in an exhaust gas, in which the generation of drawbacks (e.g. peeling of bonded area and cracking) after bonding with bonding material, or the generation of drawbacks (e.g. small holes and cracking) after coating with coating material is suppressed reliably, and which is superior in durability.

The present invention provides the following honeycomb structure in order to achieve the above aim.

[1] A honeycomb structure comprising:
porous partition walls, and
a plurality of cells each functioning as a passage of a fluid, surrounded by the porous partition walls and arranged so as to be parallel to each other in the central axis direction of the honeycomb structure,
characterized in that a plurality of honeycomb segments having such a shape that each segment is part of the honeycomb structure and, when bonded to each other in a direction normal to the central axis of the honeycomb structure, forms the honeycomb structure, are bonded integrally by a bonding material containing a ceramic as a main component and a particulate filler.

By employing such a constitution, it is possible to reliably suppress the generation of drawbacks such as peeling of bonded areas, cracking and the like after bonding with a bonding material and achieve improvement in durability. That is, by using a particulate filler, the filler rolls easily in the bonding material (the rollability of filler is improved) and the bonding material can show good spreadability during coating of the bonding material or during press-bonding. As a result, improved coatability and improved spreadability are obtainable, it is not necessary to use a large amount of a solvent for viscosity reduction of bonding material, dehydration and shrinkage during drying can be suppressed, and generation of the above-mentioned drawbacks during drying can be suppressed. Further, since the viscosity change during kneading is small, the bonding material is stable, the control for improvement in coatability and spreadability of bonding material is easy, and generation of the above-mentioned drawbacks during drying can be suppressed reliably.

In a honeycomb structure according to an exemplary embodiment, the particulate filler contained in the bonding material has an average diameter of 10 to 300 µm.

By employing such a constitution, the filler can secure rollability and the bonding material can have good dryability.

In a honeycomb structure according to an exemplary embodiment, the particulate filler contained in the bonding material has a hollow structure.

By employing such a constitution, the bonding material can have a lower Young' modulus, the honeycomb structure can have higher thermal shock resistance, and the generation of cracking during use can be suppressed more reliably.

In a honeycomb structure according to an exemplary embodiment, the bonding material contains the particulate filler in an amount of 20 to 70% by volume.

By employing such a constitution, the bonding material can secure coatability and spreadability and can have a strength, and improved durability is obtainable.

In a honeycomb structure according to an exemplary embodiment, the bonding material further contains at least one member selected from the group consisting of inorganic particles, an oxide fiber and a colloidal oxide.

By employing such a constitution, the bonding material can have improved coatability and improved spreadability.

[6] A honeycomb structure comprising:

porous partition walls, and a plurality of cells each functioning as a passage of a fluid, surrounded by the porous partition walls and arranged so as to be parallel to each other in the central axis direction of the honeycomb structure, characterized in that a plurality of honeycomb segments having such a shape that each segment is part of the honeycomb structure and, when bonded to each other in a direction normal to the central axis of the honeycomb structure, forms the honeycomb structure, are bonded integrally by a bonding material and the resulting bonded body is coated, at the outer surface, with a coating material containing a ceramic as a main component and a particulate filler.

By employing such a constitution, it is possible to reliably suppress the generation of drawbacks such small holes, cracking and the like after coating with a coating material. That is, by using a particulate filler, the filler rolls easily in the coating material (the rollability of filler is improved) and the bonding material can show good spreadability during coating of the coating material or during press-bonding. As a result, improved coatability and improved spreadability are obtainable, it is not necessary to use a large amount of a solvent for viscosity reduction of bonding material, dehydration and shrinkage during drying can be suppressed, and generation of the above-mentioned drawbacks during drying can be suppressed. Further, since the viscosity change during kneading is small, the coating material is stable, the control for improvement in coatability and spreadability of coating material is easy, and generation of the above-mentioned drawbacks during drying can be suppressed reliably.

In a honeycomb structure according to an exemplary embodiment, the particulate filler contained in the coating material has an average diameter of 10 to 300 µm.

By employing such a constitution, the filler can secure rollability and the coating material can have good dryability.

In a honeycomb structure according to an exemplary embodiment, the particulate filler contained in the coating material has a hollow structure.

By employing such a constitution, the coating material can have a lower Young' modulus, the honeycomb structure can have higher thermal shock resistance, and the generation of cracking during use can be suppressed more reliably.

In a honeycomb structure according to an exemplary embodiment, the coating material contains the particulate filler in an amount of 20 to 70% by volume.

By employing such a constitution, the coating material can secure coatability and spreadability and can have a strength, and improved durability is obtainable.

In a honeycomb structure according to an exemplary embodiment, the coating material further contains at least one member selected from the group consisting of inorganic articles, an oxide fiber and a colloidal oxide.

By employing such a constitution, the coating material can have improved coatability and improved spreadability.

As described above, according to the present invention, there is provided a honeycomb structure which is useful particularly as a filter for capturing, for example, particulates present in an exhaust gas, in which the generation of drawbacks (e.g. peeling of bonded area and cracking) after bonding with bonding material, or the generation of drawbacks (e.g. small holes and cracking) after coating with coating material is suppressed reliably, and which is superior in durability.

EXPLANATION OF SYMBOLS

1 is a honeycomb structure; 2 is a honeycomb segment; 4 is a coating material; 5 is a cell; 6 is a partition wall; 7 is a plugging material; and 9 is a bonding material.

BEST MODE FOR CARRYING OUT THE INVENTION

Figure 1:
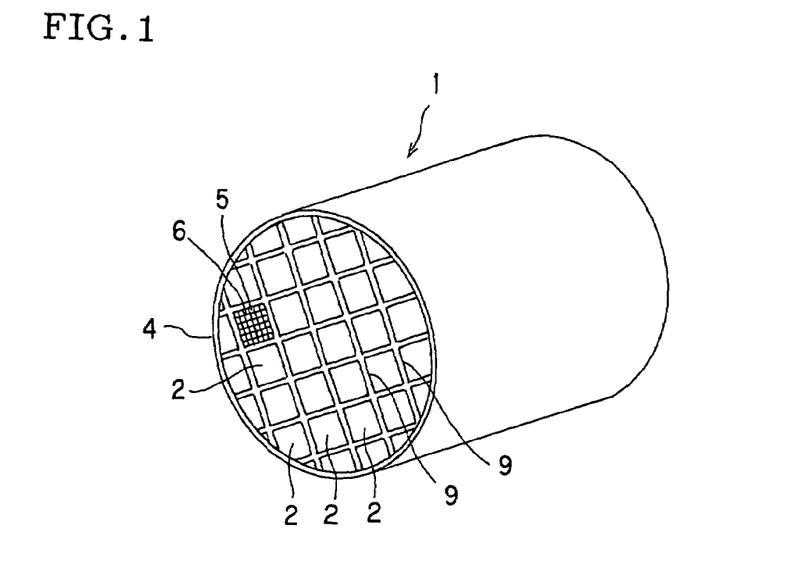
FIG. 1 is a perspective view schematically showing one embodiment of the honeycomb structure of the preset invention, having a circular sectional shape when cut in a plane normal to the central axis.
Figure 2:
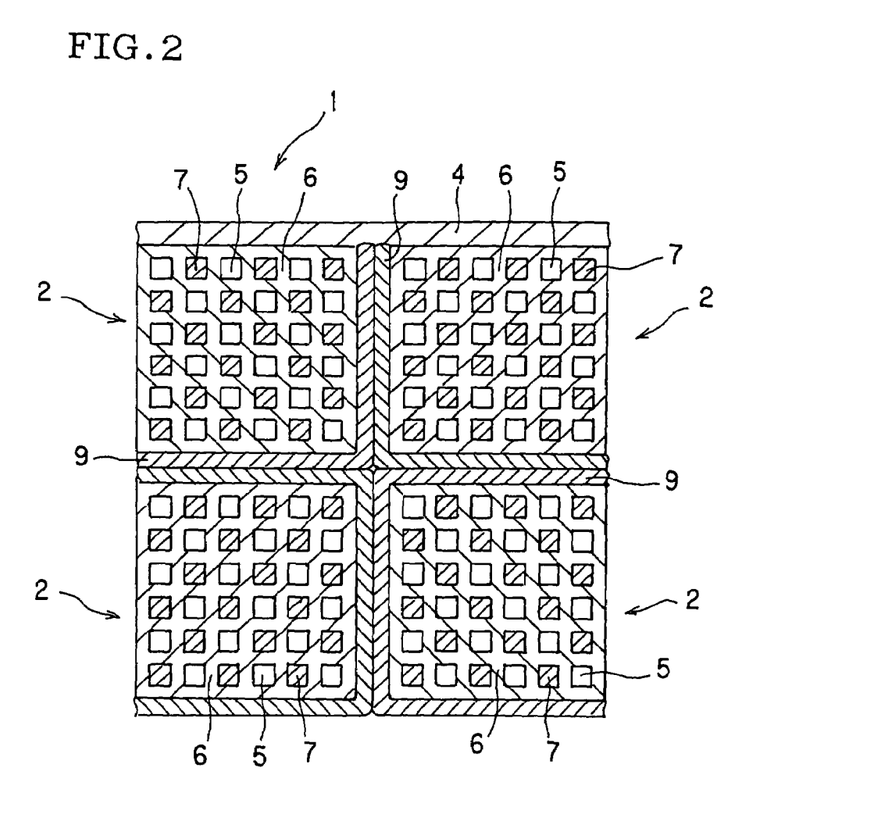
FIG. 2 is a front view when part of other embodiment of the honeycomb structure of the present invention, having a square sectional shape when cut in a plane normal to the central axis, has been seen from the end face.

As shown in FIGS. 1 and 2, the honeycomb structure 1 according to the embodiment of the present invention has a construction wherein a plurality of cells 5 each functioning as a passage of a fluid, surrounded by porous partition walls 6 are arranged so as to be parallel to each other in the central axis direction of the honeycomb structure 1, and has such a constitution that a plurality of honeycomb segments 2 having such a shape that each segment is part of the honeycomb structure 1 and, when bonded to each other in a direction normal to the central axis of the honeycomb structure 1, forms the honeycomb structure 1, are bonded integrally by a bonding material 9 containing a ceramic as a main component and a particulate filler. By the bonding of the honeycomb segments 2 with the bonding material 9, a bonded body is formed; it is subjected to grinding so that the ground body has, when cut in a plane normal to the central axis of the honeycomb structure 1, a sectional shape such as circle, oval, triangle, square or the like; and the ground body is coated with a coating material 4 at the outer surface. When the honeycomb structure 1 is used as a DPF and when it is provided in, for example, an exhaust gas system of diesel engine, it can capture the particulate (including soot) emitted from the diesel engine. Incidentally, in FIG. 1, cells 5 and partition walls 6 are indicated only in one honeycomb segment 2.

Figure 3:
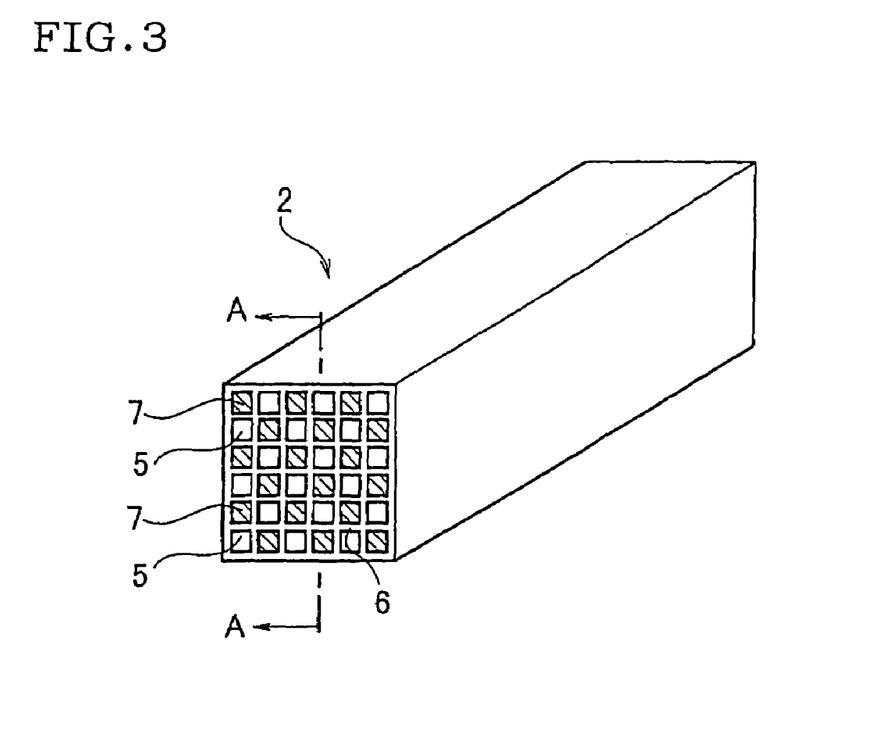
FIG. 3 is a perspective view schematically showing a honeycomb segment used in other embodiment of the honeycomb structure of the present invention.
Figure 4:
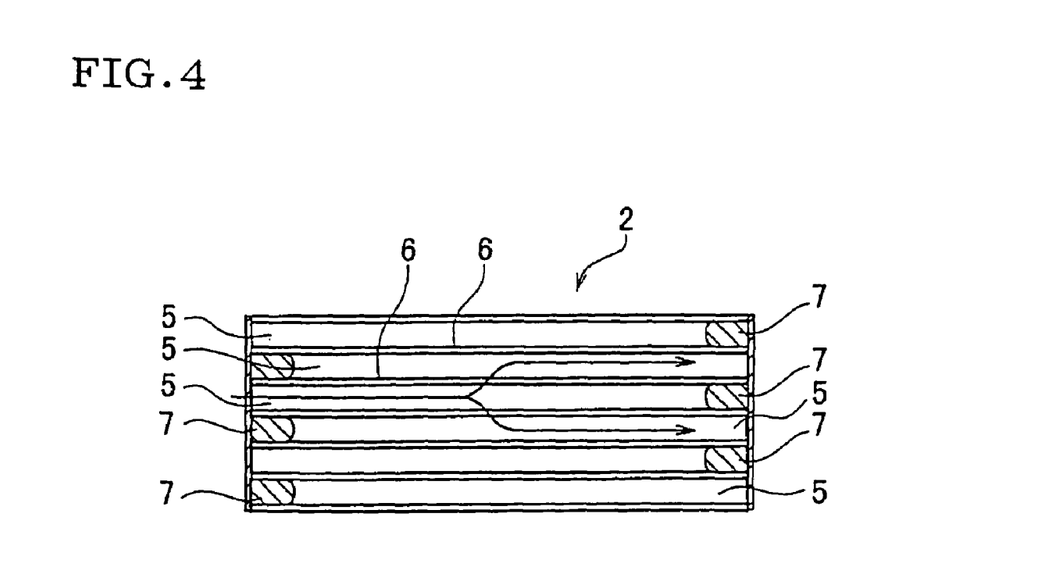
FIG. 4 is a sectional view taken at the A-A line of FIG. 3.

Each honeycomb segment 2 has such a shape that is part of the honeycomb structure 1 (see FIG. 1), as shown in FIGS. 3 and 4 and, when bonded to each other in a direction normal to the central axis of the honeycomb structure 1 (see FIG. 1), forms the honeycomb structure 1. The cells 5 are arranged so as to be parallel to each other in the central axis direction of the honeycomb structure 1. At each end face of the honeycomb segment 2, the ends of cells 5 adjacent to each other are plugged alternately by a plugging material 7.

In any given cell 5 (a gas-incoming cell), the end at the left side of FIGS. 3 and 4 is open and the end at the right side is plugged by a plugging material 7. Meanwhile, in any other cell 5 (a gas-leaving cell) adjacent thereto, the end at the left side is plugged by the plugging material 7 but the end of the right side is open. By such plugging, each end face of the honeycomb segment 2 comes to have a checked pattern such as shown in FIG. 2.

When such a honeycomb structure 1 formed by bonding of a plurality of honeycomb segments 2 is provided in an exhaust gas system, an exhaust gas enters into the cells 5 of each honeycomb segment 2 from the left side of FIG. 4 and moves to the right side.

FIG. 4 indicates a case wherein the left side of honeycomb segment 2 is an inlet of exhaust gas. An exhaust gas enters into the honeycomb segment 2 from the unplugged (open) side of each cell 5 (each gas-incoming cell). The exhaust gas in the cell 5 (gas-incoming cell) passes through porous partition walls 6, enters into each other cell 5 (each gas-leaving cell), and leaves the cell. During the passage of the exhaust gas through the partition walls 6, the particulate including soot, contained in the exhaust gas is captured by the partition walls 6.

In this way, the exhaust gas can be purified. By the above capturing, the particulate including soot deposits inside the honeycomb segments 2 with the passage of time and the pressure loss of the honeycomb segments 2 becomes larger. Hence, the honeycomb segments 2 are regenerated by burning the soot, etc.

In FIGS. 2 to 4 are shown honeycomb segments 2 having a square sectional shape. However, the sectional shape may be a triangle, a hexagon or the like. The sectional shape of cells 5 may also be a triangle, a hexagon, a circle, an oval or the like.

As shown in FIG. 2, a bonding material 9 is coated on the outer surface of each honeycomb segment 2 and functions so as to bond the honeycomb segments 2. Coating of the bonding material 9 may be conducted on the respective outer walls of honeycomb segments adjacent to each other but, between two honeycomb segments 2 adjacent to each other, may be conducted only on either one of two facing outer walls.

Such coating only on either one of two facing outer walls is preferred because the amount of the bonding material 9 used can be saved. The thickness of the bonding material 9 applied is determined in consideration of the bonding strength between honeycomb segments 2 and is appropriately selected in a range of, for example, 0.2 to 4.0 mm.

A coating material 4 is coated on the outer wall of the bonded body obtained by bonding of honeycomb segments 2 and functions so as to protect the outer wall of the bonded body of honeycomb segments 2. The thickness of the coating material 4 applied is appropriately selected in a range of, for example, 0.1 to 1.5 mm.

As the material for honeycomb segment 2, there is preferred, from the standpoints of the strength and heat resistance, at least one member selected from the group consisting of silicon carbide, silicon-silicon carbide type composite material, silicon nitride, cordierite, mullite, alumina, spinel, silicon carbide-cordierite type composite material, silicon-silicon carbide composite material, lithium aluminum silicate, aluminum titanate and Fe—Cr—Al type metal. Of these, silicon carbide or a silicon-silicon carbide type composite material is referred.

The honeycomb segment 2 can be produced, for example, by adding, to a material appropriately selected from the above-mentioned materials, a binder (e.g. methyl cellulose, hydroxypropoxy cellulose, hydroxyethyl cellulose, carboxymethyl cellulose or polyvinyl alcohol), a surfactant, water (as a solvent), etc., to prepare a body, extruding the body into the above-mentioned shape, and drying the extrudate by a microwave, hot air or the like, followed by sintering.

As the plugging material 7 used for plugging of cells 5, the same material as for honeycomb segments 2 can be used. The plugging by the plugging material 7 can be conducted by masking those cells 5 not to be plugged and, in this state, immersing the end face of honeycomb segment 2 in the plugging material 7 of slurry state to fill open (unmasked) cells 5. The plugging by the plugging material 7 may be conducted before the firing of formed honeycomb segment 2 or after the firing. However, the plugging before the firing is preferred because the firing step is completed only in one time of firing.

After the above production of honeycomb segment 2, each honeycomb segment 2 is coated, at the outer surface, with the bonding material 9 of slurry state; a plurality of the resulting honeycomb segments 2 are bonded to each other so as to give an intended three-dimensional shape (the shape of honeycomb structure 1); in this bonded state, press-bonding is conducted; then, drying is made with heating; thereby is produced a bonded body wherein a plurality of honeycomb segments 2 are bonded integrally. The bonded body is ground into the above-mentioned shape; the ground body is coated with the coating material 4 at the outer surface, followed by drying with heating; thereby is produced a honeycomb structure 1 such as shown in FIG. 1.

The bonding material 9 contains a ceramic as a main component and a particulate filler. The bonding material and the coating material may be the same material. In the present embodiment, as the ceramic contained as a main component in the bonding material 9 and the coating material 4, there can be mentioned, for example, ceramics such as silicon carbide, silicon nitride, cordierite, alumina and mullite. Thereto may be added a colloidal sol (e.g. colloidal silica or colloidal alumina) and, as necessary, a metal fiber and a pore former.

As the particulate filler contained in the bonding material 9 and the coating material 4, there can be mentioned, for example, those composed of an inorganic material or an organic material. As specific examples of the inorganic material, there can be mentioned glass beads and fly ash balloons. As specific examples of the organic material, there can be mentioned starch and a foamed resin.

The particulate filler has an average diameter of preferably 10 to 300 µm, more preferably 15 to 250 µm, particularly preferably 20 to 200 µm. When the average diameter of the particulate filler is less than 10 µm, no filler effect of rollability is exhibited; the bonding material 9 and coating material 4 are unable to show good coatability or spreadability; and suppression of drawbacks may be insufficient. Meanwhile, when the average diameter is more than 300 µm, the gaps between particles are large; as a result, the dehydration rate after coating is large, the surfaces of the bonding material 9 and coating material 4 applied are dried quickly, no sufficient bonding strength is obtained in the case of the bonding material 9 even if honeycomb segments 2 to be bonded are pressed against each other, and drawbacks such as small holes, cracking, fretting and the like tend to generate in the case of the coating material 4.

The particulate filler is preferred to have a length ratio of major central axis and minor central axis of 1.0 to 4.0 and is more preferred to be a true sphere.

The particulate filler is contained in the bonding material 9 or the coating material 4 in an amount of preferably 20 to 70% by volume, more preferably 25 to 65% by volume, particularly preferably 30 to 60% by volume. When the amount is less than 20% by volume, no filler effect may be obtained; when the amount is more than 70% by volume, no required strength may be obtained.

The particulate filler is preferred to have a hollow structure. By using particles of hollow structure (hollow particles), the bonded areas formed by curing of the bonding material 9 and the outer surface formed by curing of the coating material 4 have lower densities, enabling a reduction in Young's modulus. Thereby, the bonded areas and the outer surface have higher thermal shock resistances, and generation of cracking during use can be suppressed.

In the present embodiment, the bonding material 9 and the coating material 4 may contain, in addition to the above-mentioned ceramic and particulate filler, at least one member selected from the group consisting of inorganic particles, an oxide fiber and a colloidal oxide in an amount of 5 to 60% by mass. By containing them, the bonding material 9 and the coating material 4 can have higher properties.

As the inorganic particles, there can be mentioned, for example, at least one kind of ceramic selected from the group consisting of silicon carbide, silicon nitride, cordierite, alumina, mullite, zirconia, zirconium phosphate, aluminum titanate and titania; a Fe—Cr—Al type metal; a nickel type metal; metallic silicon; and SiC.

As the oxide fiber, there can be mentioned, for example, an aluminosilicate-based fiber and other fibers.

As the colloidal oxide, there can be mentioned, for example, a silica sol and an alumina sol.

The bonding material 9 and the coating material 4 have a thermal conductivity of preferably 0.1 to 5.0 W/m·k, more preferably 0.2 to 3.0 W/m·k. When the thermal conductivity is less than 0.1 W/m·k, the thermal conductivity between honeycomb segments 2 is hampered and the temperature inside the honeycomb structure 1 may become non-uniform. When the thermal conductivity is more than 5.0 W/m·k, the bonding strength may be reduced and it may become difficult to produce the honeycomb structure 1.

The bonding material 9 and the coating material 4 are preferred to have a relatively low thermal expansion coefficient in order to prevent the generation of cracking caused by thermal shock, etc. The thermal expansion coefficient is preferably $1 \times 10^{-6}$ to $8 \times 10^{-6}/°$ C., more preferably $1.5 \times 10^{-6}$ to $7 \times 10^{-6}/°$ C., particularly preferably $2 \times 10^{-6}$ to $6 \times 10^{-6}/°$ C.

EXAMPLES

The present invention is described more specifically below by way of Examples. However, the present invention is in no way restricted by these Examples.

In the present Examples, a SiC powder and a Si powder both as a raw material were mixed at a weight ratio of 80:20. To the resulting mixture were added starch and a foamed resin (both as a pore former), methyl cellulose and hydroxy propoxyl methyl cellulose, a surfactant and water to prepare a plastic body. The body was extruded and the extrudate was dried by a microwave and hot air to obtain a honeycomb segment having a partition wall thickness of 310 µm, a cell density of about 46.5 cells/cm$^2$ (300 cells/in.$^2$), a square sectional shape of 35 mm×35 mm, and a length of 152 mm.

The honeycomb segment was plugged at each end face by using the same material as used in production of the honeycomb segment, in such a way that one cell was open at one end face and plugged at other end face, any cell adjacent thereto was plugged at the same one end face and open at the same other end face, and each end face showed a checked pattern. The honeycomb segment was then dried, degreased at about 400° C. in the air, and fired at about 1,450° C. in an Ar inert atmosphere to obtain a fired honeycomb segment composed of Si-bonded SiC.

Meanwhile, there were mixed a foamed resin (an acrylonitrile resin) as a filler, methyl cellulose as an organic binder, a SiC powder as inorganic particles, an aluminosilicate-based fiber as an oxide fiber, an aqueous silica gel (40% by mass) solution and clay as an inorganic binder, and water. Water was added thereto and the resulting mixture was kneaded for 30 minutes using a mixer, to obtain bonded materials A to K whose compositions are shown in Table 1. Of the bonded materials A to K shown in Table 1, the bonded materials A to I were used in the present Examples and the bonded materials J and K were used in Comparative Examples, as described later.

TABLE 1

| Bonding material No. | Foamed resin Average diameter [µm] | Foamed resin [mass %] | Foamed resin [vol. %] | Methyl cellulose [mass %] | SiC powder [mass %] | Aluminosilicate fiber [mass %] | Silica gel [mass %] | Clay [mass %] | Water [mass %] |
|---|---|---|---|---|---|---|---|---|---|
| A | 15 | 1 | 40 | 0 | 41 | 24 | 23 | 1 | 10 |
| B | 100 | 1 | 40 | 0 | 41 | 24 | 23 | 1 | 10 |
| C | 250 | 1 | 40 | 0 | 41 | 24 | 23 | 1 | 10 |
| D | 100 | 0.5 | 25 | 0 | 41 | 24.5 | 23 | 1 | 10 |
| E | 100 | 4 | 65 | 0 | 40 | 24 | 22 | 1 | 9 |
| F | 5 | 1 | 40 | 0 | 41 | 24 | 23 | 1 | 10 |
| G | 500 | 1 | 40 | 0 | 41 | 24 | 23 | 1 | 10 |

TABLE 1-continued

| Bonding material No. | Foamed resin Average diameter [μm] | Foamed resin [mass %] | Foamed resin [vol. %] | Methyl cellulose [mass %] | SiC powder [mass %] | Aluminosilicate fiber [mass %] | Silica gel [mass %] | Clay [mass %] | Water [mass %] |
|---|---|---|---|---|---|---|---|---|---|
| H | 100 | 0.2 | 10 | 0 | 42 | 25 | 22 | 0.8 | 10 |
| I | 100 | 7 | 80 | 0 | 40 | 23 | 22 | 1 | 7 |
| J | — | 0 | 0 | 0 | 42 | 25 | 22 | 1 | 10 |
| K | — | 0 | 0 | 1 | 39 | 22 | 22 | 1 | 15 |

Figure 5:
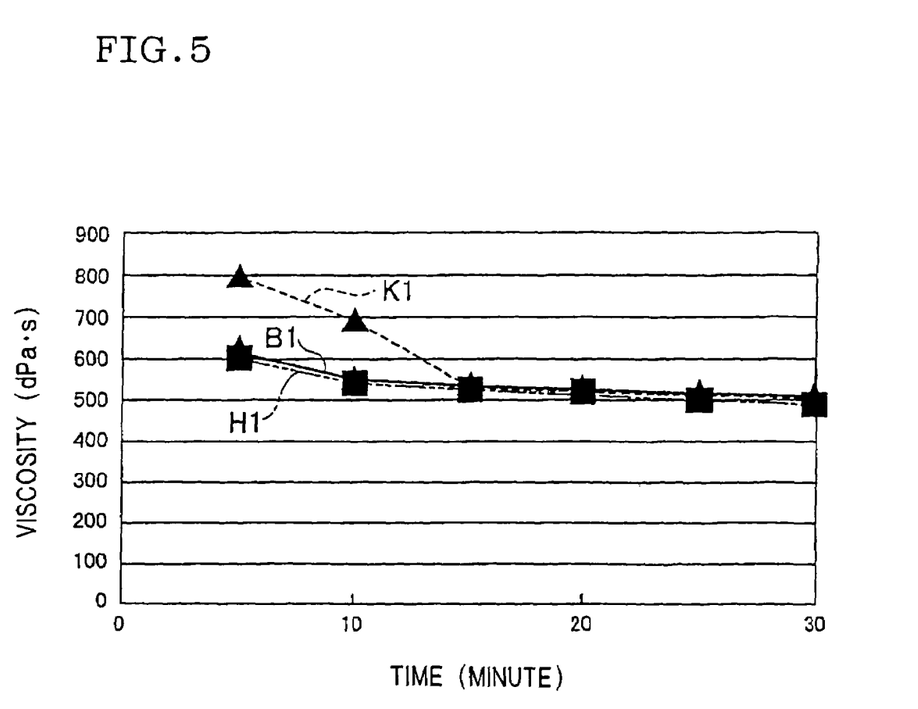
FIG. 5 is a graph showing the change of viscosity of bonding material with time, caused by kneading.

Table 2 shows the results obtained when viscosity measurement was made for the bonding materials B, H and K shown in Table 1, during their kneading at given time intervals. FIG. 5 shows the changes of viscosity with time when the bonding materials B, H and K were kneaded. In FIG. 5, the characteristic curve B1 shows when the bonding material B was used; the characteristic curve H1 shows when the bonding material H was used; and the characteristic curve K1 shows when the bonding material K was used.

TABLE 2

| Bonding Material No. | Viscosity after 5 minutes of kneading [dPa · s] | Viscosity after 30 minutes of kneading [dPa · s] | Viscosity change during kneading [dPa · s] |
|---|---|---|---|
| B | 620 | 510 | 110 |
| H | 600 | 490 | 110 |
| K | 800 | 500 | 300 |

As seen from these results, in the bonding material K (the characteristic curve K1) containing an organic binder, there is a viscosity increase at the initial period of kneading, but there is substantially no viscosity change from around after 15 minutes. In contrast, in the bonding material B (the characteristic curve B1) and the bonding material H (the characteristic curve H1) both containing a foamed resin, there is substantially no viscosity change during kneading.

Next, bonding of honeycomb segments was made using each of the bonding materials shown in Table 1. In each bonding, a plurality of the honeycomb segments produced previously were bonded so that the thickness of the bonding material used became 1 mm. The bonded honeycomb segments were dried at 200° C. for 5 hours to obtain honeycomb structures of Examples 1 to 9 and Comparative Example 1. From each honeycomb structure, ten samples for strength test were cut out and measured for three-point bending strength according to JIS R 1601. The results are shown in Table 3.

As shown in Table 3, in Comparative Example 1 using the filler-free bonding material (the bonding material J), large peeling was seen at the bonded area. In Examples 6 and 7 using the bonding materials F and G which contained a foamed resin having an average particle diameter deviating from the range of 10 to 300 μm, as well as in Examples 8 and 9 using the bonding materials H and I which contained a foamed resin of an amount deviating from the range of 20 to 70% by volume, spreadability of bonding material was insufficient and consequently peeling was seen only at part of the bonded area or the bonding strength was slightly small.

TABLE 3

| | Bonding material No. | Appearance of bonded layer | Bonding strength [Mpa] |
|---|---|---|---|
| Example 1 | A | No peeling of bonded layer | 2.9 |
| Example 2 | B | No peeling of bonded layer | 3.7 |
| Example 3 | C | No peeling of bonded layer | 2.7 |
| Example 4 | D | No peeling of bonded layer | 3.3 |
| Example 5 | E | No peeling of bonded layer | 3.2 |
| Example 6 | F | Partial peeling of bonded layer | 1.2 |
| Example 7 | G | No peeling of bonded layer | 0.9 |
| Example 8 | H | Partial peeling of bonded layer | 1.2 |
| Example 9 | I | No peeling of bonded layer | 0.7 |
| Comparative Example 1 | J | There is peeling. | 1.4 |

For Example 10 and Comparative Example 1 using the bonding materials B and J, respectively, comparison of density or strength/Young's modulus ratio was compared. The results are shown in Table 4.

In Table 4, it was confirmed that strength/Young's modulus ratio was larger in Example 10 using the bonding material B containing a hollow foamed resin than in Comparative Example 1 using the bonding material J containing no foamed resin. Thereby, improvement in thermal shock resistance during use can be expected.

TABLE 4

| | Bonding material No. | Density [g/cm³] | Strength [Mpa] | Young's modulus [Gpa] | Strength*1000/ Young's modulus ratio |
|---|---|---|---|---|---|
| Example 10 | B | 1.5 | 1.2 | 0.8 | 1.5 |
| Comparative Example 1 | J | 2.1 | 1.4 | 1.2 | 1.2 |

Water was added to each of the bonding materials A to J for viscosity adjustment necessary for coating, whereby were produced coating materials L to U. 16 fired honeycomb segments produced previously above were bonded to each other to obtain a bonded body. The outer wall of the bonded body was ground and then coated with one of the coating materials L to U, followed by drying at 200° C. for 2 hours, to obtain honeycomb structures of Examples 11 to 19 and Comparative Example 3. In Table 5 are shown the amount (mass %) of added water and the appearance of coating layer (small holes, cracking and friction) of each honeycomb structure which was examined visually.

TABLE 5

| Coating material No. | Added water [mass % relative to bonding material] | Appearance of coating layer | | |
|---|---|---|---|---|
| | | Small holes | Cracking | Friction |
| Example 11 | L | 2.0 | No | No | No |
| Example 12 | M | 2.0 | No | No | No |
| Example 13 | N | 2.0 | No | No | No |
| Example 14 | O | 3.0 | No | No | No |
| Example 15 | P | 2.0 | No | No | No |
| Example 16 | Q | 2.0 | No | No | Yes |
| Example 17 | R | 2.0 | No | Yes | No |
| Example 18 | S | 3.5 | No | Yes | No |
| Example 19 | T | 2.0 | No | Yes | No |
| Comparative Example 2 | U | 4.0 | Yes | yes | Yes |

As indicated in Table 5, drawbacks of small holes, cracking and friction generated in Comparative Example 2 using the filler-free coating material U. A sight drawback of cracking or friction generated in Examples 16 to 19 using the coating materials Q and R which contained a filler having an average particle diameter deviating from the range of 10 to 300 μm, or the coating materials S and T which contained a filler in an amount deviating from the range of 20 to 70% by volume.

INDUSTRIAL APPLICABILITY

The honeycomb structure of the present invention is useful as a filter for exhaust gas, for example, as a diesel particulate filter (DPF) for capturing and removing the particulate contained in an exhaust gas emitted from a diesel engine or the like.

The invention claimed is:

1. A honeycomb structure comprising:
a plurality of honeycomb segments each of which has a plurality of cells surrounded and defined by porous partition walls to form a honeycomb structure as a whole, and
each of the cells functions as a passage of a fluid, and is arranged to be parallel to each other in a central axis direction of the honeycomb structure,
wherein each segent is bonded integally at least at its two outer partition walls to other adjacent segments by a bonding material in a direction normal to the central axis direction to form the honeycomb structure,
the bonding material containing a ceramic as a main component. and a foamed resin having an average particle diameter of 15 to 250 μm and being contained in 25 to 65 volume percents with relation to total volume of the bonding material, the foamed resin promoting coatability and spreadability of the bonding material by virtue of rollability of the foamed resin,
whereby the bonding material with the foamed resin has less suppression in shrinkage caused by dehydration, and is substantially free from peeling and cracking.

2. A honeycomb structure according to claim 1, wherein the bonding material further contains at least one member selected from the group consisting of inorganic particles, an oxide fiber and a colloidal oxide.

3. A honeycomb structure according to claim 1, wherein an amount of the foamed resin used in the bonding material is 0.5 to 4 percents by weight.

4. A honeycomb structure according to claim 1, wherein the bonding material has a bonding strength of 1.2 MPa or more.

5. A honeycomb structure comprising:
a plurality of honeycomb segments each of which has a plurality of cells surrounded and defined by porous partition walls to form a honeycomb structure as a whole;
each of the cells functions as a passage of a fluid, and is arranged to be parallel to each other in a central axis direction of the honeycomb structure, each segment being bonded integrally at least at its two outer partition walls to other adjacent segments by a bonding material containing a ceramic as a main component;
an outer wall formed of a plurality of segments bonded with the bonding material, the outer wall being ground; and
a surface coat layer formed on an outer surface of the outer wall,
wherein the surface coat layer has a coating material containing a ceramic as a main component, and a foamed resin having an average particle diameter of 15 to 250 μm and being contained in 25 to 65 volume percents with relation to total volume of the coating material, the foamed resin promoting coatability and spreadability of the coating material and coating material and promoting suitable viscosity of the coating material for coating,
whereby the surface coat layer is substantially free from small holes, cracks and fractions in its surface.

6. A honeycomb structure according to claim 5, wherein the coating material further contains at least one member selected from the group consisting of inorganic particles, an oxide fiber and a colloidal oxide.

7. A honeycomb structure according to claim 5, wherein an amount of the foamed resin used in the coating material is 0.5 to 4 percents by weight.

8. A honeycomb structure according to claim 5, wherein the coating material has a bonding strength of 1.2 MPa or more.

* * * * *